3,403,971
FERRIPOLYPHOSPHATES
James F. Hazel and Wallace M. McNabb, Havertown, and Mary Kieran McElroy, Philadelphia, Pa., assignors, by mesne assignments, to Research Corporation, New York, N.Y., a nonprofit corporation of New York
No Drawing. Continuation-in-part of application Ser. No. 472,665, July 16, 1965. This application Feb. 20, 1967, Ser. No. 617,045
21 Claims. (Cl. 23—105)

ABSTRACT OF THE DISCLOSURE

Novel ferripolyphosphates have molar $Fe_2O_3/P_2O_5$ ratios from 0.35 to 0.5 corresponding to the empirical formula $Fe_2(OH)_x(PO)_y \cdot nH_2O$ wherein $x$ has any value from 0.5 to 2, $y$ is $6-x$ and $n$ is any value from 0 to 15. They may be made by admixing a water-soluble ferric salt and an alkali metal glassy polyphosphate or the free acid thereof in the presence of water in the proportion of about one mole of iron to three moles of $PO_3$ groups. They are good reversible adsorbents of water and they adsorb ammonia and other Lewis bases.

---

This application is a continuation-in-part of application Ser. No. 472,665, now abandoned, filed July 16, 1965.

The invention relates to novel ferripolyphosphates having molar $Fe_2O_3/P_2O_5$ ratios from 0.35 to 0.5 corresponding to the empirical formula $Fe_2(OH)_x(PO_3)_y \cdot nH_2O$ wherein $x$ has any value from 0.5 to 2, $y$ is $6-x$ and $n$ is any value from 0 to 15. They are good reversible adsorbents of water and they adsorb ammonia and other Lewis bases.

The ferripolyphosphates of the invention may be made by adding an aqueous solution of an alkali metal glassy polyphosphate to an aqueous solution of a water-soluble ferric salt. A yellow flocculent precipitate is first formed which changes to a granular white solid as further glassy polyphosphate is added up to about 3 moles of ($PO_3$) groups per mole of iron. The addition of further polyphosphate causes the precipitate to dissolve but the ferripolyphosphate of the invention can be prepared from such solutions by precipitating the alkali metal iron phosphate complex with a water-miscible organic liquid such as methanol, ethanol, dioxane, acetone, 2-propanol or 1-propanol, disolving the precipitate in water, and then adding this solution (I) to a ferric salt solution until the molar $PO_3/Fe$ ratio is about 3. Alternatively, the solution referred to above as "I" may be passed through a cation exchange resin in the hydrogen form to convert the complex to the free acid and adding this solution to a ferric salt solution. The solution of the soluble alkali metal iron phosphate complex may also be formed by rapidly mixing a ferric salt solution with a solution of glassy alkali metal polyphosphate in the ratio of one mole of iron to six moles of $PO_3$ groups. The solution of the complex then is mixed rapidly with an amount of ferric salt solution sufficient to bring the molar $PO_3/Fe$ ratio to about 3. In this procedure the flocculent yellow precipitate does not appear but a white ferripolyphosphate gel is directly produced.

The ferripolyphosphate also may be prepared by passing a solution of alkali metal glassy polyphosphate through a cation exchange resin in the hydrogen form in order to transform the phosphate to the free acid, followed by the addition of this solution to a solution of ferric salt in water or a water-miscible organic liquid such as methanol. The precipitate which forms is separated by filtration and washed with the organic liquid.

In general, the products obtained by adding alkali metal glassy polyphosphate solutions which are about 3 M as to $PO_3$ groups to 0.5 molar ferric salt solutions until the ratio of $PO_3$ groups to iron atoms is a little less than 3 to 1, are of superior uniformity and adsorptive capacity.

The following are illustrative examples of methods of preparing the ferripolyphosphate compositions of the invention:

EXAMPLE 1

An aqueous solution of glassy sodium polyphosphate is prepared by dissolving 30.5 g. of glassy sodium polyphosphate (Calgon R–S Unadjusted Form of Calgon Company) in rapidly stirred water to give a total volume of 100 ml. This 3 molar $PO_3$ solution is added with stirring to a 0.5 M aqueous solution of ferric chloride until the flocculent yellow precipitate which first forms is changed to a white precipitate. The total addition of phosphate is kept at slightly less than 3 moles of $PO_3$ groups per mole of iron. Care is taken to avoid an excess of polyphosphate to prevent dissolution of the precipitate, by testing for complete precipitation of the iron with KCNS. The precipitate is filtered off and redispersed in water only once (because of the tendency of the precipitate to peptize in water). Further redispersion in the water-miscible organic liquid and filtration are continued until the washings are substantially free of sodium and chloride. The precipitate may be air dried on porous plates or paper pads and may be further dried by evacuation or by heating in an oven at about 108° C. for one or two hours.

EXAMPLE 2

A 3 molar $PO_3$ solution is prepared as described in Example 1. This solution is mixed rapidly with a 0.5 M aqueous solution of ferric chloride in the ratio of slightly less than 3 moles of $PO_3$ groups per mole of iron to form a white gel. The gel is allowed to shrink and extrude liquid (undergo syneresis) for a few hours. The liquid is discarded. The gel is leached with water, followed by leaching with a water-miscible organic liquid, in order to decrease the sodium chloride content of the gel. The gel is then dispersed in the organic liquid, filtered and dried as in Example 1.

The ferripolyphosphate product made in this manner has a molar $Fe_2O_3/P_2O_5$ ratio of about 0.4. Neglecting the presence of residual products of metathesis such as sodium chloride, as well as varying amounts of other phosphates formed by hydrolysis of $PO_3$ groups, the product may be represented by the empirical formula $Fe_{11}P_{27}O_{84} \cdot xH_2O$, or $Fe_2(OH)(PO_3)_5 \cdot nH_2O$ as well as by the structural formula:

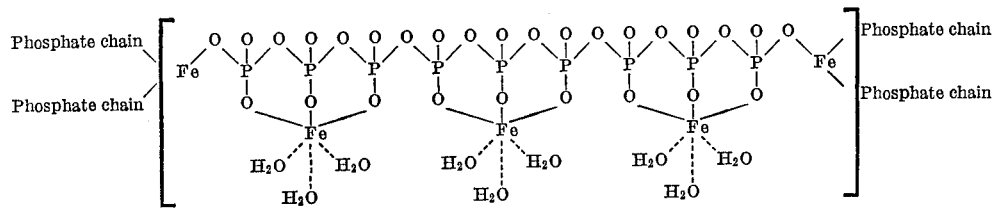

The phosphorus chain length is that of the alkali metal polyphosphate used in the method.

A sample made according to the method of Example 1 and oven-dried at 108±2° C. to constant weight give the following water adsorptions in mg. per gram at varying relative humidities:

| Relative humidity, percent: | Adsorption, mg./gm. |
| --- | --- |
| 31 | 57.1 |
| 52 | 63.0 |
| 71 | 109.0 |
| 79 | 135.0 |
| 88 | 164.0 |
| 100 | 197.5 |

Desorption at 0.1 atmosphere pressure for one-half hour at room temperature amounts to about 40% of the initial adsorption and shows good cycling performance.

The specific surface area of this sample calculated on the assumption of a monomolecular layer of adsorbed water is 660 square meters per gram. Even higher specific surface area, up to about 1200 square meters per gram can be obtained with milder drying conditions.

Similar gels may be made by sprinkling solid powdered glassy sodium polyphosphate on the surface of 0.5 M aqueous ferric chloride solution with stirring in the ratio of slightly less than 3 moles of $PO_3$ groups to one mole of iron.

Gels having similar properties may be made by admixing comminuted ferric salt such as $FeCl_3 \cdot 6H_2O$ with powdered glassy sodium polyphosphate in the ratio of at least one mole of iron to three moles of $PO_3$ groups, and slowly stirring the mixture into water in sufficient volume to permit the reaction to go to completion as judged by the precipitate becoming white on standing.

Ferripolyphosphate gels made by gradually adding aqueous solutions of glassy sodium polyphosphate that are less concentrated than about 3 molar in $PO_3$ groups to aqueous ferric chloride solutions less concentrated than about 0.5 M tend to be more basic in composition. Thus, the gradual addition of a glassy sodium polyphosphate solution that has a concentration of 0.6 molar in $PO_3$ groups to a 0.1 M aqueous solution of ferric chloride yields a ferripolyphosphate gel having a molar $Fe_2O_3/P_2O_5$ ratio of about 0.48, and an empirical formula: $Fe_2(OH)_{1.8}(PO_3)_{4.2} \cdot nH_2O$.

The ferripolyphosphate gels made by any of the methods described herein may be stored in the wet state in airtight containers for eventual use without subjecting them to a drying operation or they may be converted into aquasols by washing the gels with water until a major portion of the gel forms a stable aqueous dispersion.

We claim:
1. A ferripolyphosphate having a molar $Fe_2O_3/P_2O_5$ ratio between 0.35 and 0.5 and the empirical formula $Fe_2(OH)_x(PO_3)_y \cdot nH_2O$ wherein $x$ is any value from 0.5 to 2, $y$ is $6-x$ and $n$ is any value from 0 to about 15.

2. A ferripolyphosphate as defined in claim 1 wherein $n$ is a value between about 4 and about 8.

3. A ferripolyphosphate as defined in claim 1 wherein the molar $Fe_2O_3/P_2O_5$ ratio is about 0.4.

4. A ferripolyphosphate as defined in claim 3 wherein $n$ is a value between about 4 and about 8.

5. A method of making ferripolyphosphate which comprises admixing a water-soluble ferric salt and an alkali metal glassy polyphosphate or the free acid thereof in the presence of water in the proportion of about one mole of iron to three moles of $PO_3$ groups.

6. A method of making a ferripolyphosphate which comprises adding an aqueous solution of an alkali metal glassy polyphosphate to an aqueous solution of a water-soluble ferric salt until the iron is substantially completely precipitated, separating the precipitate and drying the separated precipitate to a water content between 0 and about 35 weight percent.

7. The method of claim 6 wherein the separated precipitate is washed with a water-miscible organic liquid.

8. The method of claim 7 wherein the separated precipitate is dried to a water content between about 12 and about 22 weight percent.

9. A method of making a ferripolyphosphate which comprises adding an aqueous solution of about 300 grams of glassy sodium polyphosphate per liter to about a 0.5 molar aqueous solution of a water-soluble ferric salt until the iron is substantially completely precipitated, washing the precipitate at least once with water and then with a water-miscible organic liquid and separating the precipitate.

10. The method of claim 9 wherein the separated precipitate is dried until said precipitate contains between 0 and about 35 weight percent of water.

11. The method of claim 9 wherein the separated precipitate is dried to a water content between about 12 and about 22 weight percent.

12. A method of making a ferripolyphosphate which comprises adding an aqueous solution of a glassy alkali metal polyphosphate to an aqueous solution of a water-soluble ferric salt until the precipitate initially formed redissolves, adding a water-miscible organic liquid until precipitation ceases, separating the precipitate dissolving it in water, adding this solution to a ferric salt solution, separating the precipitate, and drying the separated precipitate to a water content between 0 and about 35 weight percent.

13. A method of making a ferripolyphosphate which comprises adding an aqueous solution of a glassy alkali metal polyphosphate to an aqueous solution of a water-soluble ferric salt until the precipitate initially formed redissolves, adding an aqueous 0.5 M solution of a ferric salt until precipitation is complete, washing the precipitate with water and then with a water-miscible organic liquid, separating the precipitate, and drying the separated precipitate to a water content between 0 and about 35 weight percent.

14. The method of claim 12 wherein the alkali metal polyphosphate is glassy sodium polyphosphate.

15. The method of claim 13 wherein the alkali metal polyphosphate is glassy sodium polyphosphate.

16. The method of claim 15 wherein the glassy sodium polyphosphate has an average of about 9 phosphorus atoms per chain.

17. The method of claim 12 wherein the separated precipitate is dried to a water content between about 12 and about 22 weight percent.

18. A method of making a ferripolyphosphate which comprises passing an aqueous solution of a glassy alkali metal polyphosphate through a cation resin in the hydrogen form to convert the phosphate to the free acid, adding this solution to a water solution of a water soluble ferric salt until the ratio of $PO_3$ groups to iron atoms is about 3 to 1, separating the precipitate, and drying the precipitate to a water content between 0 and about 35 weight percent.

19. The method of claim 18 wherein the separated precipitate is dried to a water content between about 12 and about 22 weight percent.

20. A method of making a ferripolyphosphate which comprises slowly adding solid powdered glassy sodium polyphosphate to an aqueous solution of 0.5 molar ferric chloride until the ratio of $PO_3$ groups to iron atoms is about 3 to 1, separating the precipitate, and drying the precipitate to a water content of between 0 and about 35 weight percent.

21. A method of making a ferripolyphosphate aqueous dispersion comprising adding an aqueous solution of an alkali metal glassy polyphosphate to an aqueous solution of water-soluble ferric salt until the iron is substantially completely precipitated and washing the precipitate with water until a major portion of the precipitate forms a stable aqueous dispersion.

References Cited

UNITED STATES PATENTS 2,414,974 1/1947 Nielson _____ 23—105
3,014,784 12/1961 Knight et al. _____ 23—105

OTHER REFERENCES

W. E. Cate et al.: "Preparation of Crystalline Ferric Phosphates," Soil Science, vol. 88, No. 3, September 1959, pp. 130–132.

Gmelins: Handbuch der Anorganischen Chemie, 8 Auflage, TEIL. B LIEF. 1–5 System No. 59, (1932), pp. 768 and 770.

P. Pascal: Nouveau Traité de Chimie Minérale, Tome XVIII, pp. 132 and 134 (1959).

OSCAR R. VERTIZ, *Primary Examiner.*

L. A. MARSH, *Assistant Examiner.*